United States Patent
Benedetti et al.

(10) Patent No.: US 12,143,395 B2
(45) Date of Patent: Nov. 12, 2024

(54) LOW TRUST PRIVILEGED ACCESS MANAGEMENT

(71) Applicant: International Business Machines Corporation, Armonk, NY (US)

(72) Inventors: Fabio Benedetti, Rome (IT); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 16/866,929

(22) Filed: May 5, 2020

(65) Prior Publication Data

US 2021/0352077 A1   Nov. 11, 2021

(51) Int. Cl.
| | |
|---|---|
| *H04L 29/06* | (2006.01) |
| *G06F 16/23* | (2019.01) |
| *G06F 16/27* | (2019.01) |
| *G06Q 10/10* | (2023.01) |
| *H04L 9/40* | (2022.01) |

(52) U.S. Cl.
CPC ........ *H04L 63/105* (2013.01); *G06F 16/2379* (2019.01); *G06F 16/27* (2019.01); *G06Q 10/10* (2013.01); *H04L 63/20* (2013.01)

(58) Field of Classification Search
CPC ....... H04L 63/105; H04L 63/20; G06F 16/27; G06F 16/2379; G06Q 10/10
See application file for complete search history.

(56) References Cited

U.S. PATENT DOCUMENTS

| | | | |
|---|---|---|---|
| 6,460,141 | B1 | 10/2002 | Olden |
| 6,839,843 | B1 * | 1/2005 | Bacha .................... H04L 63/10 380/258 |
| 10,102,526 | B1 | 10/2018 | Madisetti et al. |
| 10,484,343 | B1 * | 11/2019 | Silberman ............. H04L 9/3239 |
| 10,824,747 | B1 * | 11/2020 | Magerkurth ......... G06F 21/604 |

(Continued)

FOREIGN PATENT DOCUMENTS

| | | |
|---|---|---|
| CN | 108123936 A | 6/2018 |
| CN | 110401618 A | 11/2019 |

(Continued)

OTHER PUBLICATIONS

XACML, Wikipedia, https://en.wikipedia.org/wiki/XACML. Retrieved from the internet on Feb. 17, 2022.

(Continued)

*Primary Examiner* — Shin-Hon (Eric) Chen
(74) *Attorney, Agent, or Firm* — Scott S. Dobson

(57) ABSTRACT

An access management process orchestration method, an access management governance orchestrator, and a computer program product. One embodiment may comprise receiving a request for accessing a managed resource of an information system, querying an authorization for accessing the resource from an access manager, and in response to the querying of the authorization, requesting an access control policy update to grant the access to the managed resource. Receiving the request, querying the authorization, and requesting the access control policy update may comprise generating a transaction record, and adding the transaction record to a distributed ledger, wherein the distributed ledger simultaneously maintains the transaction record at multiple nodes throughout a network.

13 Claims, 16 Drawing Sheets

(56) References Cited

U.S. PATENT DOCUMENTS

| | | | |
|---|---|---|---|
| 10,893,123 B2* | 1/2021 | Chen | H04L 67/60 |
| 11,436,368 B2* | 9/2022 | Beno | H04L 9/3247 |
| 11,494,344 B2 | 11/2022 | Jayachandran et al. | |
| 11,556,923 B2* | 1/2023 | Kadarmandalgi | H04L 9/0637 |
| 2011/0072486 A1 | 3/2011 | Hadar et al. | |
| 2017/0244721 A1 | 8/2017 | Kurian et al. | |
| 2018/0123882 A1* | 5/2018 | Anderson | H04L 43/16 |
| 2019/0147106 A1* | 5/2019 | Androulaki | G06F 16/9038 707/722 |
| 2019/0173854 A1* | 6/2019 | Beck | H04L 67/10 |
| 2019/0179939 A1* | 6/2019 | Govindarajan | G06F 16/2358 |
| 2019/0205563 A1* | 7/2019 | Gonzales, Jr. | G06Q 20/3825 |
| 2019/0268284 A1 | 8/2019 | Karame et al. | |
| 2019/0356471 A1* | 11/2019 | Vaughn | G06F 21/64 |
| 2019/0370358 A1 | 12/2019 | Nation et al. | |
| 2020/0177604 A1* | 6/2020 | Wei | H04L 9/3234 |
| 2020/0245128 A1* | 7/2020 | Obaidi | H04M 1/72463 |
| 2020/0267187 A1* | 8/2020 | Singh | H04L 63/123 |
| 2021/0037060 A1* | 2/2021 | Robison | H04L 63/123 |
| 2021/0135857 A1* | 5/2021 | Parvataneni | H04L 67/104 |
| 2021/0174432 A1* | 6/2021 | Gonnaud | G06Q 20/401 |
| 2021/0203503 A1* | 7/2021 | Soundararajan | H04L 9/3226 |
| 2021/0243193 A1* | 8/2021 | Padmanabhan | G06F 16/252 |
| 2021/0391992 A1* | 12/2021 | Schiffman | H04L 9/3247 |
| 2022/0052988 A1* | 2/2022 | Gadnis | H04L 67/104 |

FOREIGN PATENT DOCUMENTS

| | | |
|---|---|---|
| CN | 110457875 A | 11/2019 |
| GB | 2540977 A | 8/2017 |
| JP | 2018-533857 A | 11/2018 |
| JP | 2019-160312 A | 9/2019 |
| JP | 2019-185642 A | 10/2019 |
| JP | 2020-524825 A | 8/2020 |
| KR | 10-2020-0032086 A | 3/2020 |
| WO | 2017/040263 A1 | 3/2017 |
| WO | 2018039722 A1 | 3/2018 |
| WO | 2019078879 A1 | 4/2019 |
| WO | 2019083837 A2 | 5/2019 |
| WO | 2019155333 A1 | 8/2019 |
| WO | 2019/231578 A | 12/2019 |
| WO | 2021224696 A1 | 11/2021 |

OTHER PUBLICATIONS

PCT/IB2021/052873, International Search Report and Written Opinion, mailed Jul. 15, 2021.

Si Francesco Maesa et al., "Blockchain Based Access Control," Printed Mar. 30, 2020, 14 pages.

Mell et al., "The NIST Definition of Cloud Computing," Recommendations of the National Institute of Standards and Technology, U.S. Department of Commerce, Special Publication 800-145, Sep. 2011, 7 pages.

Xu et al., "DL-BAC: Distributed Ledger Based Access Control for Web Applications," 2017 International World Wide Web Conference Committee (IW3C2), Apr. 3-7, 2017, Australia, 6 pages, ACM 978-1-4503-4914-7/17/04, http://dx.doi.org/10.1145/3041021.3053897.

"Examination report under sections 12 & 13 of the Patents Act, 1970 and the Patents Rules, 2003", Government of India, Date of Dispatch/Email: Feb. 27, 2023, Application No. 202247063109, 8 pages.

Australian Government, IP Australia, Examination report No. 1 for standard patent application, Sep. 8, 2023, Application No. 2021269192, 4 pages.

Intellectual Property Office, Request for the Submission of an Opinion, Aug. 20, 2024, 16 pages, KR Application No. 10-2022-7035935.

Japanese Patent Office, "Notice of Reasons for Refusal," Sep. 3, 2024, 15 Pages, JP Application No. 2022-564722.

\* cited by examiner

Block$_i$ 790

Header 772$_i$

- Hash Value of Previous Block
- Reference Information

File(s) (and Metadata) 774$_i$

| Data 1 | REF 1 | Metadata 1 |
| Data 2 | REF 2 | Metadata 2 |
| . | . | . |
| . | . | . |
| . | . | . |
| Data N | REF N | Metadata N |

Value 776$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 7D

LOW TRUST PRIVILEGED ACCESS MANAGEMENT

BACKGROUND

The present disclosure relates to computer security, and more specifically, orchestrating access to privileged and administrative functions on critical IT systems that store/process sensitive data.

The development of the Electronic Discrete Variable Automatic Computer (EDVAC) system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

Today's computer systems are essential to technical advancement and have become an important part of everyday life. As a result, the technical issue of security of these computing systems has increased in importance. One important facet of computer security is privilege access management and privileged account management. A privileged user is a user who has a higher level of access (e.g., an administrator or "root" superuser of a system) and/or who has a special level of access (e.g., ability to read and write files with secret information) in a computing system. Privilege access management and privileged account management, in turn, generally involves managing and auditing the accounts that provide system and data access to those privileged users.

SUMMARY

According to embodiments of the present disclosure, an access management process orchestration method. One embodiment may comprise receiving a request for accessing a managed resource of an information system, querying an authorization for accessing the resource from an access manager, and in response to the querying of the authorization, requesting an access control policy update to grant the access to the managed resource. Receiving the request, querying the authorization, and requesting the access control policy update may comprise generating a transaction record, and adding the transaction record to a distributed ledger, wherein the distributed ledger simultaneously maintains the transaction record at multiple nodes throughout a network.

According to embodiments of the present disclosure, an access management governance orchestrator, comprising a peer node associated with a blockchain network, the blockchain network comprising a plurality of nodes associated with at least one of an asset owner function, an administrator function, and an auditor function. The peer node may be adapted to record a request access record from a user of an information system in a distributed ledger, record an owner approval record from the asset owner function, the owner approval record responsive to the request access record in the distributed ledger, execute a smart contract responsive to the request access record and the owner approval record granting access on the information system, wherein the smart contract changes an authorization policy to allow access of the user to the information system, and record an execution record of the smart contract in the distributed ledger.

According to embodiments of the present disclosure, a computer program product comprising a non-transitory computer readable storage medium having a plurality of instructions stored thereon. The instructions, when executed by a processor, may cause the processor to receive a request for accessing to a managed resource of an information system, query an authorization for accessing the resource from an access manager, and in response to the querying the authorization, request an access control policy update to grant the access to the managed resource. Receiving the request, querying the authorization, and requesting the access control policy update may comprise generating a transaction record, and adding the transaction record to a distributed ledger.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7D illustrates a block which may represent the structure of blocks in the blockchain, according to example embodiments.

Figure 1:
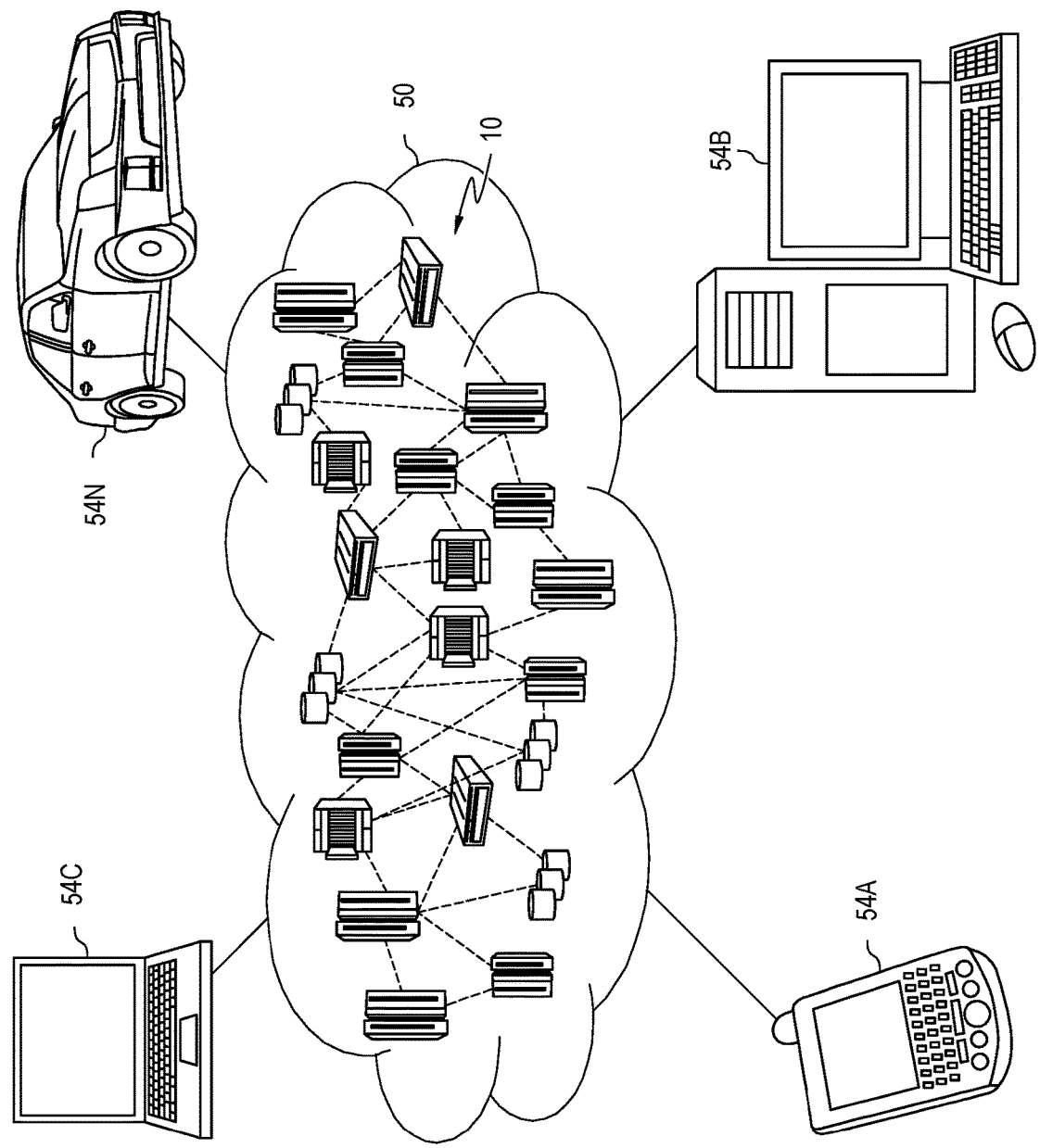
FIG. 1 depicts a cloud computing environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security; more particular aspects relate to orchestrating access to privileged and administrative functions on critical IT systems that store/process sensitive data. While the present disclosure is not necessarily limited to such applications, various aspects of the disclosure may be appreciated through a discussion of various examples using this context.

One important aspect of IT security is managing the access of privileged users, such as those users who can perform administrative actions to critical IT systems that store/process sensitive data. The access of a privileged user to an IT system may be allowed or denied by an access control system based on authentication and authorization policies. These policies are generally set by the highest level of administrators of the IT system.

Effective access control systems may try to control modifications to security policies in an attempt to ensure that only approved changes are made (e.g., when a new operator is hired, and thus needs access to the IT system to perform their job). These changes to the security policies, in turn, may be managed by an access management governance process through an access management governance orchestrator.

Some access management governance processes for managing access to an IT system, in turn, may be composed of one or more of the following actions: (i) requesting access; (ii) approving access; (iii) granting access; (iv) reviewing access; (v) revoking access; and (vi) authorizing access. Some access management governance processes may involve one or more of the following entities: (i) owner of the IT system; (ii) privileged user that needs access to the IT system; (iii) administrator of the security of the IT system that controls the access policies to the IT system that authorize or deny the access to privileged users; (iv) third party auditor authority; and (v) access management process orchestrator. In some embodiments, this process may include the following workflow:

1. A user seeking authorization to a managed asset in an IT system submits a request for access, typically providing a justification to the access management process orchestrator;
2. The process orchestrator determines who is the owner of the managed asset and/or the IT system, and routes the request to it;
3. The owner of the asset and/or IT system receives the access request, reviews the justification, decides to approve or reject the request, and returns the approved/rejected request to the process orchestrator;
4. If the request is approved, the process orchestrator submits a grant access request to the administrator and/or local control system associated with the managed asset and/or IT system;
5. The administrator and/or local control system receives the request and grants access to the requesting user by applying changes to the system's authorization policies to enable the privileged user to login and access the system;
6. The request, approval/rejection, access grant actions are logged by the process orchestrator in an audit log; and
7. A third-party auditor authority requests from the process orchestrator the audit log to review that access has been granted according to regulations (enterprise, government, industry, etc.) and that all policies have been correctly applied.

When the privileged user completes its work and does not need access anymore, the process orchestrator may submit a revoke access to the administrator and/or local control system, which removes access by applying changes to the system's security. The process orchestrator may trigger the revoke request when it receives a request from the privileged user to remove access, the maximum time allotted for the access expires, after periodic review performed by the IT System Owner of the privileged users that have currently access to the IT system if they still have valid justification to continue to access it, after review of a third-party auditor authority (who may have identified a violation of security policies and raises a security incident requesting access revocation), and the like.

In some embodiments, the access management governance orchestrator may be a system that receives and processes these requests. In these embodiments, the access management governance orchestrator routes the requests to the appropriate owners, administrators, etc. The person or organization that administers the target systems can be different from the person or organization that owns the target system: e.g., a bank that owns database systems and uses an external security organization to manage the process. The administrator of the IT system may also be an automated system that executes with no judgement or further verification the grant access requests that are routed to it by the process orchestrator organization.

In some embodiments, the access management governance orchestrator may advantageously include a distributed ledger (e.g., blockchain) that will disperse the authority and ensure full transparency on the operations by all the involved parties by simultaneously maintaining transaction records at multiple points throughout a network. In particular, some embodiments may provide an access management governance process for orchestrating how to request, approve, grant, revoke, validate, etc., changes to the authorization policies, including access management governance orchestrator interfaces each of the local IT system access control systems to request changes to the authorization policies. In this way, some embodiments may provide an alternative to complete trust among the participants because each knows that no other party can circumvent the access management process, or force/trick an employee to grant/revoke access even if no approval was issued by the data owner, etc.

One advantage of some access management governance orchestrator embodiments with blockchains is that they may reduce vulnerability to attacks coming from the inside to the access management systems (e.g., bad behavior of employees). For example, without this feature, employees in the organization and/or employees with an external organization that manages their IT assets may have sufficient power to tamper with the processes and to violate security policies. A rogue employee under those circumstances could send a "grant access" request to the IT system (i.e., without the approval from the system owner), and tamper the audit logs to hide or change that access approval. Even log signing and other anti-tamper techniques could theoretically be circumvented by a rogue employee with sufficient rights, e.g., by hacking the centralized system code/configuration that it fully owns, stopping any access revocation for rogue users, providing to the third-party auditor tampered audit logs that do not show security policies violations, etc. Access management governance orchestrators that use blockchains, in contrast, may provide owner of an IT system, administrators of those IT systems, and/or data custodians with confidence that access cannot be granted to the system and/or data without the owner explicitly and transparently approving that access. Embodiments using blockchains may further help reassure auditors and regulators that documented processes cannot be circumvented. These features and advantages may be of particular use in scenarios involving sensitive personal information, data subject to regulations, confidential information, trade secret information, and the like.

Additionally, some embodiments may ensure that nobody can forge "AccessApproved" and "GrantAccess" transactions and add them to the blockchain ledger. If someone did hack a node to forge the transactions and push them into the ledger, these embodiments may not reach consensus to accept the transactions. This, in turn, may be desirable because "access manager" no longer needs to be a privileged role, or even be trusted, in some embodiments. That is, the IT owners can be confident that transactions accepted in the distributed ledger have been validated by multiple nodes controlled by different parties, and thus, that none of the approvals are forged. For even further protection from code hacking that could present a forged transaction, some embodiments may allow owners and IT administrator to optionally deploy their own private nodes (i.e., with full control on the code implementation and configuration) and add it to the blockchain network. In this way, some embodiments may provide for improved trust among the participants because each knows that no individual or entity can circumvent the access management process or force/trick someone to grant/revoke access even if no approval was issued by the data owner.

Some embodiments may allow IT administrators to validate transactions, such as GrantAccess transactions and the associated AccessApproved transactions, by the owner of the target system. If the transactions are inconsistent with the information that the IT administrator has, then the IT administrator can block the granting. In this way, if IT administrators suspect hacking activities that try to break the ledger consistency, they can just disconnect the offending source from the network or could request to the network to ban the associated access manager (and, if the blockchain network reaches consensus, the access manager may even be removed from the blockchain network).

Some embodiments may also provide for better auditability because auditing of the sequence of transaction may be cryptographically guaranteed by a blockchain system. In these embodiments, the distributed ledger may be immutable, and thus, accepted transactions cannot be changed, hacked, etc. Moreover, transactions may be guaranteed to be accepted in the distributed ledger if and only if the network reached consensus that they are valid. An attacker trying to hack fake transaction into the ledger, even with code changes, protocol spoofing/forging etc. would be required to hack enough nodes of the network to force a consensus on the forged transactions. This possibility has very low probability of success, which can even be further reduced ensuring that multiple (independent) auditors are participating in the network and no consensus is reached without a majority of them reaching agreement. In these embodiments, audit organization that join the network to validate transactions can, for further protection from code hacking that could present to them forged transaction, also deploy their private nodes (with full control on the code implementation and configuration) and add them to the blockchain network.

Some embodiments may further provide high availability of the distributed system that overlook the security process. In these embodiments, failure of one or more nodes do not affect the availability of the global blockchain and clients can connect to other nodes.

Cloud Computing

FIG. 1 illustrates a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
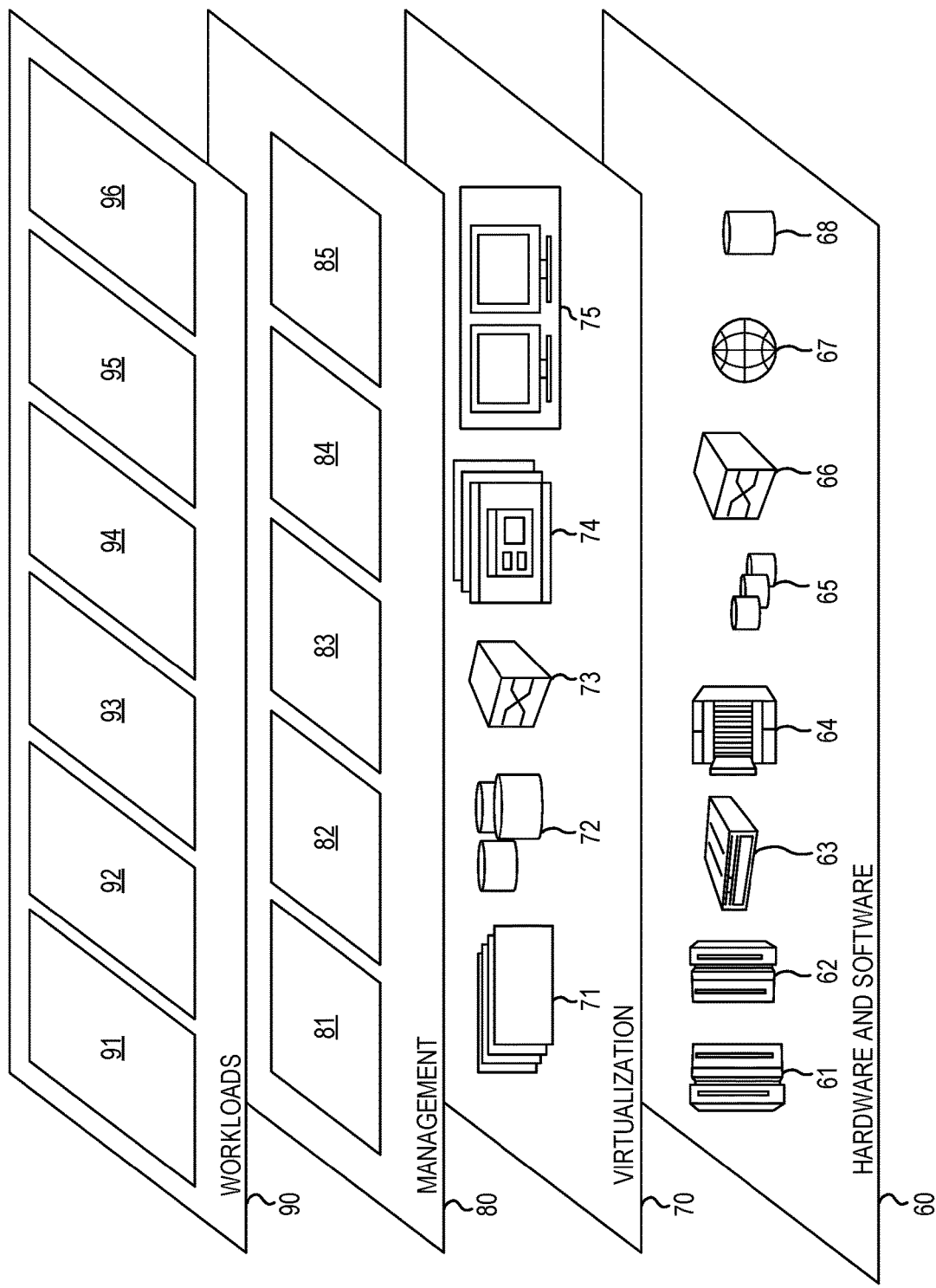
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access management governance orchestrator 96.

Data Processing System

Figure 3:
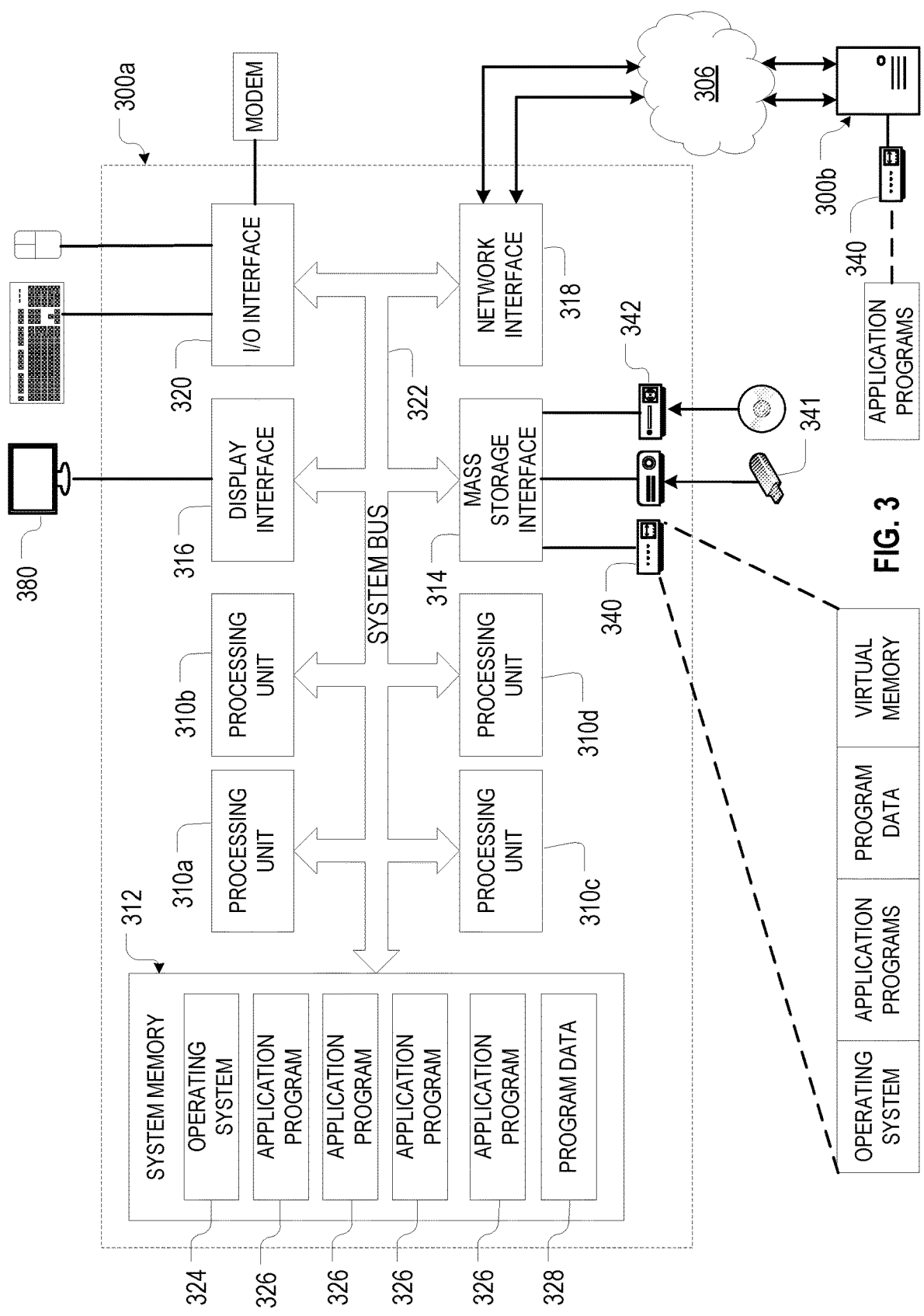
FIG. 3 depicts a data processing system, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3× "Ethernet" specifications; cellular transmission networks; wireless networks implemented one of the IEEE 802.11×, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Access Management Governance Orchestrator

Figure 4:
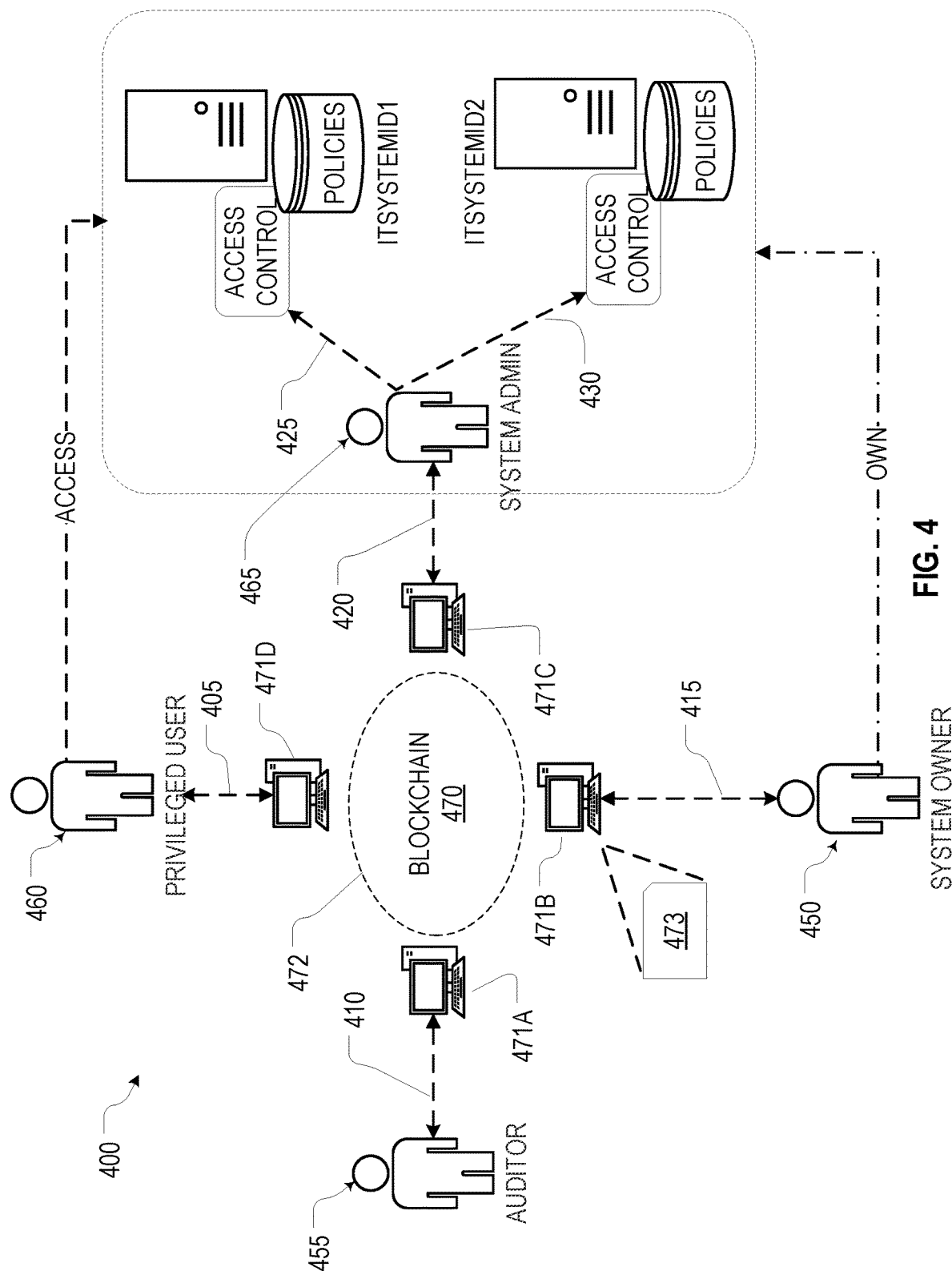
FIG. 4 is a schematic diagram of a privilege orchestrator, consistent with some embodiments.

FIG. 4 is a schematic diagram of an access management governance orchestrator 400, consistent with some embodiments. This access management governance orchestrator 400 embodiment is described with reference to a system owner function 450, an auditor function 455, a user requesting system privileges function 460, and a system administrator function 465 that communicate via a blockchain 470. In an illustrative transaction, the user requests additional privilege 405 from the access management governance orchestrator 400, and the owner function 450 may approve or reject that request 415. After the owner function 450 approves the request, the system administrator function 465 may grant the corresponding access 425, 430 on the physical IT system(s). The auditor 455 can confirm 410 that the owner approved those new privileges. In some embodiments, the system owner function 450, the auditor function 455, the user requesting system privileges 460, and the system administrator function 465 may all be part of different legal entities, and thus, may use different internal technical systems to manage access. In these use cases, the different functions may interface with the access management governance orchestrator 400 via standardized application programming interfaces (API) or the like.

The blockchain 470 in this embodiment may be a network of nodes 471A, 471B, 471C, 471D (collectively nodes 471) located in different logical, physical, and entity locations (geographic, organizations, hosting, etc.). The nodes 471 may be connected between each other via encrypted network communication channels 472. In some embodiments, nodes 471 may be added to this blockchain 470 if, and only if, they have been approved to do so by the other, preexisting nodes 471 in the blockchain 470 according to a consensus protocol.

Each node 471 in this embodiment may maintain a copy of a distributed ledger 473 (only one copy depicted in FIG. 4 for clarity) that lists all the accepted transactions submitted to the blockchain 470. A transaction in this embodiment may be accepted if, and only if, there is agreement between the nodes 471 in the blockchain 470 according to the consensus protocol. A transaction can only be added to the distributed ledger 473 in this embodiment, as all past transactions in the distributed ledger 473 are immutable and cannot be changed. Moreover, the distributed ledger 473 may be cryptographically signed to ensure tampering with the records is virtually impossible.

In some embodiments, the nodes 471 may execute smart contracts (i.e., computer programs submitted by clients that process transactions in the ledger 473, such as to digitally facilitate, verify, or enforce performance of the transaction). Their duties may include, without limitation: (i) validating transactions, i.e., participate in the consensus protocol that accepts new transaction in the ledger; (ii) proposing new transactions to the ledger, which may or may not be accepted; and (iii) performing actions with external clients to process one or more transactions. A smart contract may be executed in parallel on all nodes 471 of the blockchain 470, and the result of the smart contract may only be accepted by the blockchain 470 if, and only if, there is agreement between the nodes 471 in the network according to a consensus protocol.

In some embodiments, the blockchain 470 may be a permissioned blockchain. In these embodiments, clients (e.g., users, software applications) may only connect to the blockchain 470 via nodes 471A, 471B, 471C, 471D, which authenticates and authorizes them. Clients in these embodiments may invoke a blockchain network API to submit transactions, query transactions states and attributes, etc. These transactions may include, without limitation: (i) clients proposing new transactions to be added to the ledger that then go through the consensus protocol to have them accepted by the distributed ledger; (ii) clients checking for new transactions accepted by the distributed ledger that they are authorized to process; and (iii) clients submitting smart contracts to the blockchain 470.

The access management system in some embodiments may be implemented by using the blockchain 470 to enable associating identities to the entities that have granted access rights to connect/call services provided by the blockchain 470. These entities may have rights to connect to an existing node 471A, 471B, 471C, 471D or to add an additional node (not shown) to which they can connect. These entities may also have rights to submit and interact with smart contracts from the node 471A, 471B, 471C, 471D to which they are connected. The entities, and the smart contracts they submit, may have rights to get/submit transactions that have attributes that match the access policy criteria.

Blockchain Network API

Some embodiments may support the following types of transactions, together with the following attributes:

RequestAccess (UID, ITSystemID, privileges, reason)
AccessApproved (UID, ITSystemID, privileges, UIDOwner, approval description, RequestTID)
AccessDenied (UID, ITSystemID, privileges, UIDOwner, deny description, RequestTID)
GrantAccess (UID, ITSystemID, privileges, UIDAdmin, reason, approval description, ApprovalTID)
AccessGranted (UID, ITSystemID, privileges, UIDAdmin, reason, approval description, ApprovalTID)
RevokeAccess (UID, ITSystemID, UIDAM/UIDAuditor, reason)
AccessRevoked (UID, ITSystemID, UIDAM/UIDAuditor, reason)

RequestValidationP ( )
1. on new RequestAccess (UID, ITSystemID, privileges, reason) transaction
2. find UIDOwner of the system ITSystemID
3. submit transaction RequestApproveAccess (UID, ITSystemID, privileges, UIDOwner, reason. RequestTID)

OwnerApprovalP (ITSystemID)
1. on new RequestAccess (UID, ITSystemID, privileges, UIDOwner) transaction with ITSystemID==ITSystemID
2. verify that the reason provided by UID to request access to ITSystemID with privileges is valid
3. if it is valid
   1. submit transaction ApprovalTID=AccessApproved (UID, ITSystemID, privileges, UIDOwner, approval description, RequestTID)
   2. submit transaction GrantAccess (UID, ITSystemID, privileges, UIDOwner, approval description, ApprovalTID)
4. else submit transaction AccessDenied (UID, ITSystemID, privileges, UIDOwner, deny description, RequestTID)

GrantAccessP (ITSystemID)
1. on new AccessGranted (UID, ITSystemID, privileges, UIDOwner, approval description, RequestTID) transaction with ITSystemID==ITSystemID
2. double check that UIDOwner is the owner of ITSystemID then send message to ITSystemID Access Control (authorization) system to perform action: Grant with parameters UID, ITSystemID, privileges, UIDOwner, approval description, RequestTID.
   The Grant action changes the authorization policy to allow access of user UID to systems ITSystemID.

LogAccess (ITSystemID)
1. Wait for request from Bob to perform action Grant or Revoke passing parameters: UID, ITSystemID, UIDAdmin, description, RequestTID
2. If action=grant then update access for UID and submit transaction AccessGranted (UID, ITSystemID, privileges, UIDAdmin, description, ApprovalTID)
3. Else action=revoke then revoke access for UID and submit transaction AccessRevoked (UID, ITSystemID, UIDOwner, description, ApprovalTID)

RevokeAccessP (ITSystemID)
1. on new RevokeAccess (UID, ITSystemID, UIDOwner, reason, RequestTID) transaction with ITSystemID==ITSystemID
2. double check that UIDOwner are valid then send message to ITSystemID Access Control (authorization) system to perform action Revoke with parameters UID, ITSystemID, UIDOwner, revoke description, RequestTID)
   The Revoke action changes the authorization policy to deny access of user UID to systems ITSystemID.

AuditActionsP (List of ITSystemIDs)
1. on new transactions with ITSystemID in List of ITSystemIDs
2. validate the transactions and that the security policies are respected. For example:
   RequestApproved: RequestTID is RequestAccess for UID, UIDOwner is owner of ITSystemID, reason is valid
   GrantAccess: ApprovalTID is a AccessApproved transaction for UID/SystemID, UIDOwner is owner of ITSystemID, approval reason is valid
   AccessGranted: ApprovalTID is a AccessApproved transaction for UID/SystemID, UIDOwner is owner of ITSystemID, UIDAdmin is administrator of SystemID, approval reason is valid
   If the policies are not respected, then open security incident Illustrative Example In an illustrative example, if the following entities with the following specified identities exist in a particular privilege orchestration system:
Eve: Owner Organization of Systems ITSystemID1,
Eve: Owner Organization of Systems ITSystemID2
Bob (real person or automation): Administrator of Systems ITSystemID1, ITSystemID2
Auditor: Audit Organization of ITSystemID1, ITSystemID2
Alice: Privileged User
and the following access policies are defined:
Eve: reads RequestAccess transactions with attributes ITSystemID=ITSystemID1, ITSystemID2
Eve: submits AccessApproved, AccessDenied, GrantAccess, RevokeAccess transactions with attributes ITSystemID=ITSystemID1, ITSystemID2
Bob: reads GrantAccess, RevokeAccess, Request transactions with attributes ITSystemID=ITSystemID1, ITSystemID2
Bob: ITSystemID1, ITSystemID2: submit AccessGranted, AccessRevoked transactions with attributes ITSystemID=ITSystemID1, ITSystemID2
Auditor: reads all type of transactions with any attributes
and following nodes have been added to the blockchain 470:
Node1: Hosted by the Access Management Organization
Node2: Hosted by Owner Organization of Systems ITSystemID1, Systems ITSystemID2
Node3: Hosted by Administrator of Systems ITSystemID1, ITSystemID2
Node4: Hosted by Audit Organization of ITSystemID1, ITSystemID2

Figure 5A:
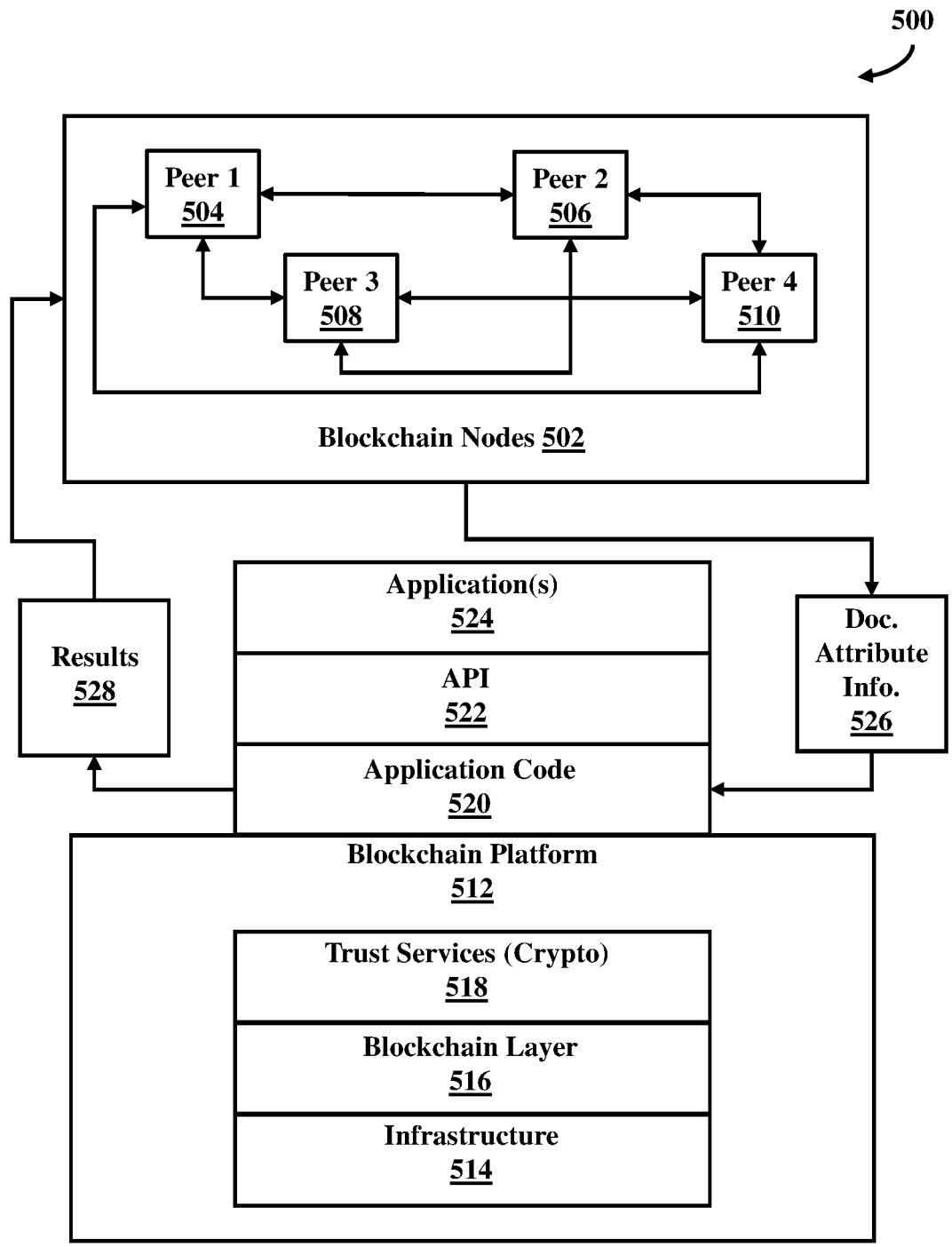
FIG. 5A depicts an example blockchain architecture configuration, consistent with some embodiments.

Then, in this illustrative example, the following processing may be performed by the clients calling the blockchain network API in operation:
Alice connects to Node1 to submit access request for ITSystemID1
Eve connects to Node2 and executes OwnerApprovalP (ITSystemID1) program
Eve connects to Node2 and executes OwnerApprovalSP (ITSystemID2) program
Bob connects to Node3 and executes GrantAccessP (ITSystemID1) program
Bob connects to Node3 and executes GrantAccessP (ITSystemID2) program
Bob connects to Node3 and executes RevokeAccessP (ITSystemID1) program
Bob connects to Node3 and executes RevokeAccessP (ITSystemID2) program
ITSystemID1 and ITSystemID2 connects to Node3 and executes LogAccessP( ) program Auditor connects to Node4 and executes AuditActionsP (ITSystemID1, ITSystemID2) for execution Blockchain Architecture FIG. 5A illustrates a blockchain architecture configuration 500, consistent with some embodiments. The blockchain architecture 500 in these embodiments may include certain blockchain elements, for example, a group of blockchain nodes 502. The group of blockchain nodes 502, in turn, may include one or more member nodes 504-510 (these four nodes are depicted by example only). These member nodes 504-510 may participate in a number of activities, such as blockchain transaction addition and validation process (consensus). One or more of the member nodes 504-510 may endorse transactions based on endorsement policy and may provide an ordering service for all blockchain nodes in the architecture 500. A member node 504-510 may initiate a blockchain authentication and seek to write to a blockchain immutable ledger stored in blockchain layer 516, a copy of which may also be stored on the underpinning physical infrastructure 514.

The blockchain architecture 500 in some embodiments may include one or more applications 524, which are linked to application programming interfaces (APIs) 522 to access and execute stored program/application code 520 (e.g., chaincode, smart contracts, etc.). The stored program/application code 520, in turn, can be created according to a customized configuration sought by participants and can maintain its own state, control their own assets, and receive external information. The stored program/application code 520 can be deployed as a transaction and installed, via appending to the distributed ledger, on all blockchain nodes 504-510.

A blockchain base or platform 512 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 516 may expose an interface that provides access to the virtual execution environment necessary to process the program code and engage a physical infrastructure 514. Cryptographic trust services 518 may be used to verify transactions such as asset exchange transactions and keep information private.

The blockchain architecture configuration of FIG. 5A may process and execute the program/application code 520 via one or more interfaces exposed, and services provided, by the blockchain platform 512. The program/application code 520 may control blockchain assets. For example, the code 520 can store and transfer data, and may be executed by member nodes 504-510 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 526 may be processed by one or more processing entities (e.g., virtual machines) included in the blockchain layer 516. A result 528 may include a plurality of linked shared documents. The physical infrastructure 514 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code in some embodiments may be used to create a temporary data structure in a virtual machine or other computing platform. Data written to the blockchain in these embodiments may be public, or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 5B:
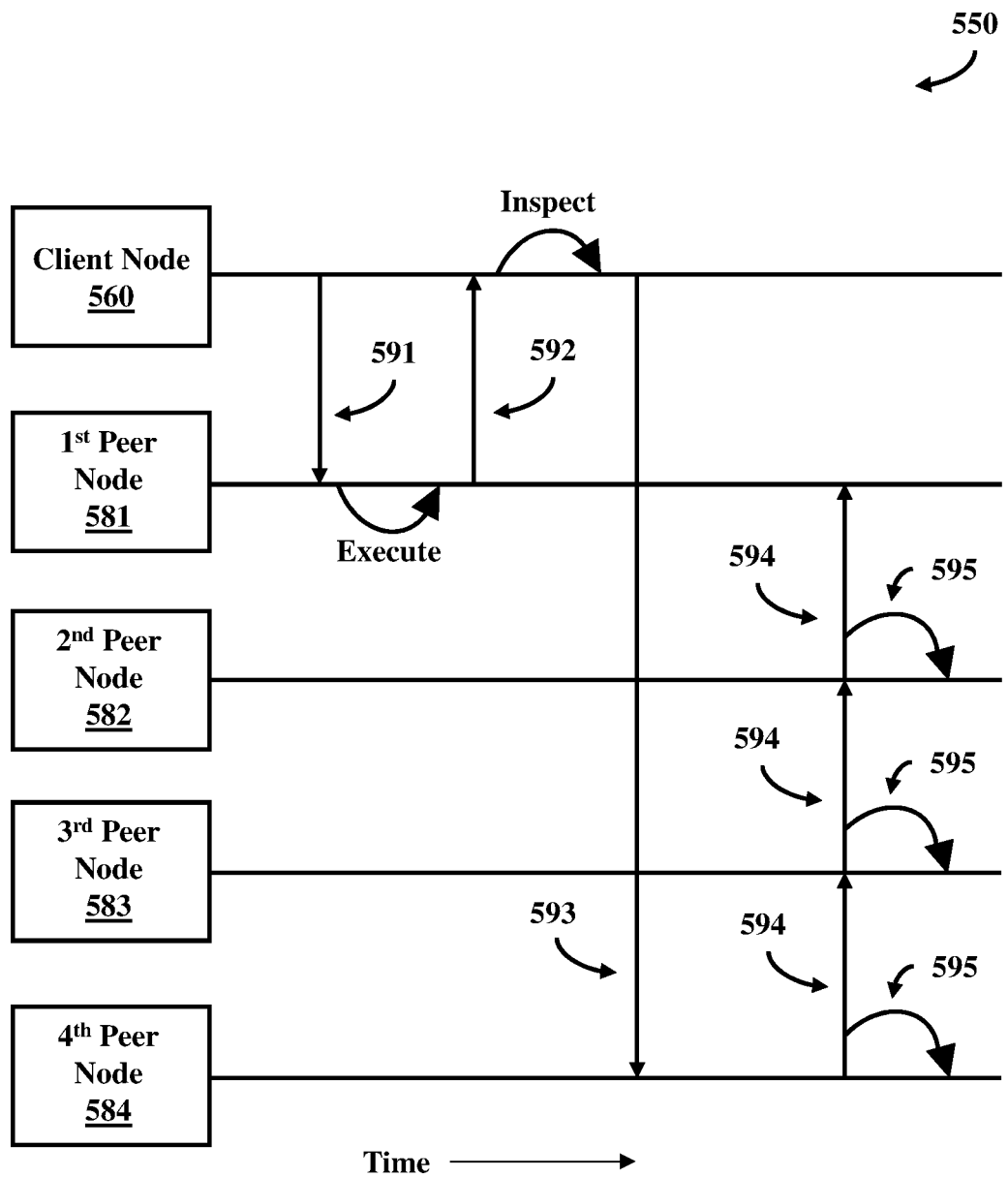
FIG. 5B illustrates a blockchain transactional flow, consistent with some embodiments.

FIG. 5B illustrates an example of a blockchain transactional flow 550 between nodes of the blockchain in accordance with some embodiments. The transaction flow in these embodiments may include a transaction proposal 591 sent by an application client node 560 to an endorsing peer node 581. The endorsing peer 581 may verify the client signature and execute a chaincode function to initiate the transaction. The output may include the chaincode results, a set of key/value versions that were read in the chaincode (read set), and the set of keys/values that were written in chaincode (write set). The proposal response 592 may then be sent back to the client 560, along with an endorsement signature, if approved.

In response, the client 560 may assemble the endorsements into a transaction payload 593 and broadcasts it to an ordering service node 584. The ordering service node 584 may then deliver ordered transactions as blocks to all peers 581-583 on a channel. Before committal to the blockchain, each peer 581-583 may validate the transaction. For example, the peers in some embodiments may check the endorsement policy to ensure that the correct allotment of the specified peers have signed the results and authenticated the signatures against the transaction payload 593.

With continuing reference to FIG. 5B, the client node 560 in some embodiments may initiate the transaction 591 by constructing and sending a request to the peer node 581, which may act an endorser. The client 560 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 581 may verify: (a) that the transaction proposal is well formed; (b) the transaction has not been submitted already in the past (replay-attack protection); (c) the signature is valid; and (d) that the submitter (client 560, in this example embodiment) is properly authorized to perform the proposed operation on that channel. The endorsing peer node 581 may take the transaction proposal inputs as arguments to the invoked chaincode function. The chaincode may then be executed against a current state database to produce transaction results including a response value, read set, and write set. In some embodiments, no updates are made to the ledger at this point. Instead, the set of values, along with the endorsing peer node's 581 signature may be passed back as a proposal response 592 to the SDK of the client 560 which parses the payload for the application to consume.

In response, the application of the client 560 may inspect/verify the endorsing peers' signatures, and may compare the proposal responses to determine if the proposal response is the same. If the chaincode only queried the ledger, the application may inspect the query response and would typically not submit the transaction to the ordering node service 584. If the client application intends to submit the transaction to the ordering node service 584 to update the ledger, the application may determine if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in operation 593, the client 560 may assemble endorsements into a transaction and may broadcast the transaction proposal and response within a transaction message to the ordering node 584. The transaction may contain the read/write sets, the endorsing peers' signatures, and a channel ID. The ordering node 584 does not need to inspect the entire content of a transaction in order to perform its operation, instead the ordering node 584 may simply receive transactions from all channels in the network, order them chronologically by channel, and create blocks of transactions per channel.

The blocks of the transaction may be delivered from the ordering node 584 to all peer nodes 581-583 on the channel. The transactions 594 within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 595 each peer node 581-583 may append the block to the channel's chain, and for each valid transaction the write sets are committed to current state database. An event may be emitted to notify the client application that the transaction (invocation) has been immutably appended to the chain, as well as to notify whether the transaction was validated or invalidated.

Permissioned Blockchains

Figure 6A:
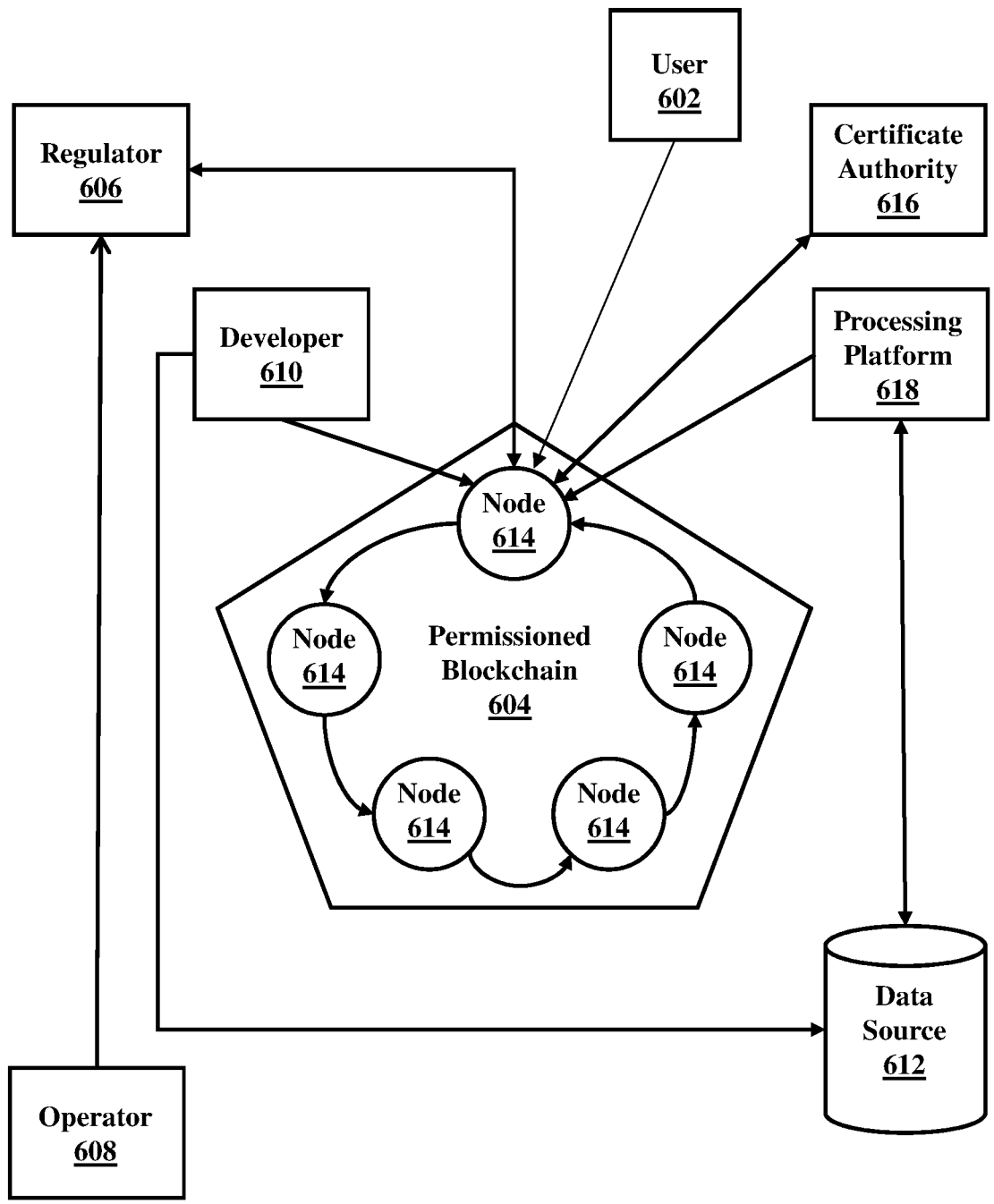
FIG. 6A illustrates a flow diagram, consistent with some embodiments.

FIG. 6A illustrates an example of a permissioned blockchain network, which features a distributed, decentralized peer-to-peer architecture, consistent with some embodiments. In this example, a blockchain user 602 may initiate a transaction to the permissioned blockchain 604. In this example, the transaction may be a deploy, invoke, or query, and may be issued through a client-side application leveraging an SDK, directly through an API, etc. Networks may provide access to a regulator 606, such as an auditor. A blockchain network operator 608 manages member permissions, such as enrolling the regulator 606 as an "auditor" and the blockchain user 602 as a "client". An auditor may be restricted only to querying the ledger whereas a client may be authorized to deploy, invoke, and query certain types of chaincode.

A blockchain developer 610 can write chaincode and client-side applications in some embodiments. The blockchain developer 610 in these embodiments may deploy chaincode directly to the network through an interface. To include credentials from a traditional data source 612 in chaincode, the developer 610 may use an out-of-band connection to access the data. In this example, the blockchain user 602 may connect to the permissioned blockchain 604 through a peer node 614. Before proceeding with any transactions, the peer node 614 may retrieve the user's enrollment and transaction certificates from a certificate authority 616, which manages user roles and permissions. In some embodiments, blockchain users must possess these digital certificates in order to transact on the permissioned blockchain 604. In other embodiments, blockchain users may be authenticated using other techniques, such as via distributed chains of trust. Meanwhile, a user attempting to utilize chaincode may be required to verify their credentials on the traditional data source 612. To confirm the user's authorization, chaincode may use an out-of-band connection to this data through a traditional processing platform 618.

Figure 6B:
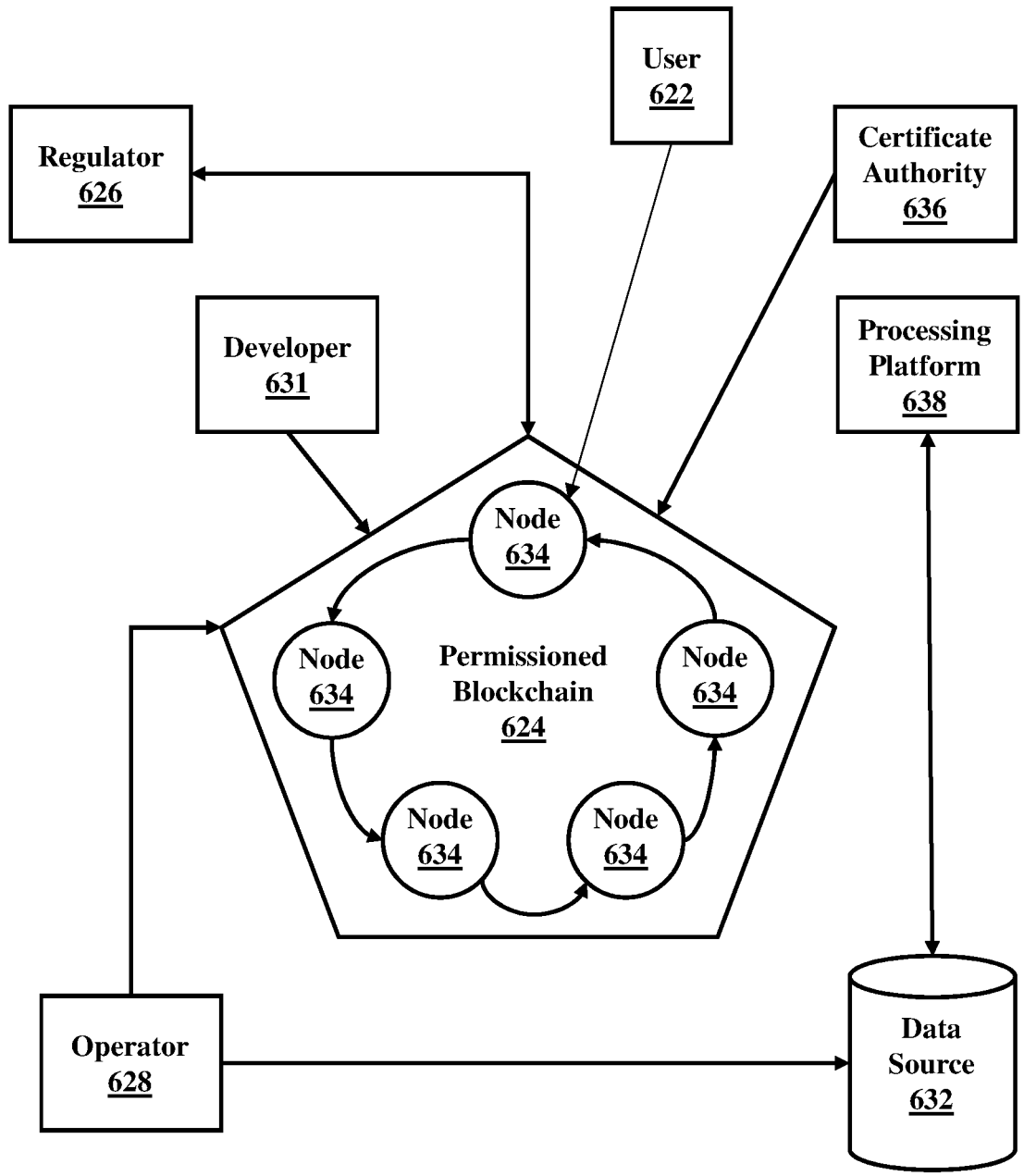
FIG. 6B illustrates a further flow diagram, consistent with some embodiments.

FIG. 6B illustrates another example of a permissioned blockchain network, which features a distributed, decentralized peer-to-peer architecture, consistent with some embodiments. In this example, a blockchain user 622 may submit a transaction to the permissioned blockchain 624. In this example, the transaction can be a deploy, invoke, or query, and may be issued through a client-side application leveraging an SDK, directly through an API, etc. Networks may provide access to a regulator 626, such as an auditor. A blockchain network operator 628 manages member permissions, such as enrolling the regulator 626 as an "auditor" and the blockchain user 622 as a "client." An auditor could be restricted only to querying the ledger whereas a client could be authorized to deploy, invoke, and query certain types of chaincode.

A blockchain developer 631 in these embodiments may write chaincode and client-side applications. The blockchain developer 631 may deploy chaincode directly to the network through an interface. To include credentials from a traditional data source 632 in chaincode, the developer 631 may use an out-of-band connection to access the data. In this example, the blockchain user 622 connects to the network through a peer node 634. Before proceeding with any transactions, the peer node 634 retrieves the user's enrollment and transaction certificates from the certificate authority 636. In some embodiments, blockchain users must possess these digital certificates in order to transact on the permissioned blockchain 624. In other embodiments, blockchain users may be authenticated using other techniques, such as via distributed chains of trust. Meanwhile, a user attempting to utilize chaincode may be required to verify their credentials on the traditional data source 632. To confirm the user's authorization, chaincode can use an out-of-band connection to this data through a traditional processing platform 638.

Figure 6C:
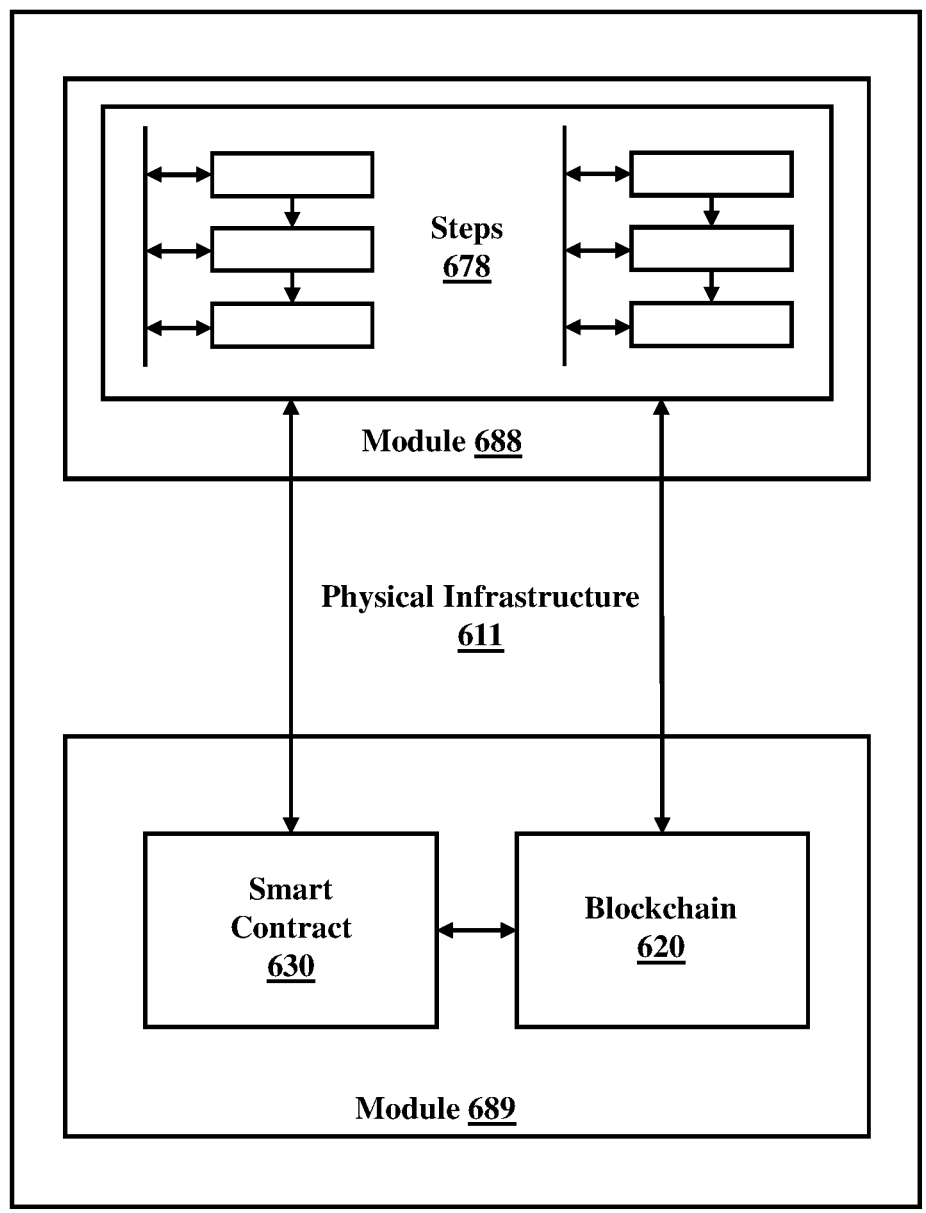
FIG. 6C illustrates an example system configured to perform one or more operations described herein, consistent with some embodiments.

FIG. 6C illustrates an example system that includes a physical infrastructure 611 configured to perform various operations, consistent with some embodiments. Referring to FIG. 6C, the physical infrastructure 611 includes a module 688 and a module 689. The module 619 includes a blockchain 620 and a smart contract 630 (which may reside on the blockchain 620), that may execute any of the operational steps 678 (in module 612) included in any of the example embodiments. The steps/operations 678 may include one or more of the embodiments described or depicted and may represent output or written information that is written or read from one or more smart contracts 630 and/or blockchains 620. The physical infrastructure 611, the module 688, and the module 689 may include one or more computers, servers, processors, memories, and/or wireless communication devices. Further, the module 688 and the module 689 may be a same module.

Figure 6D:
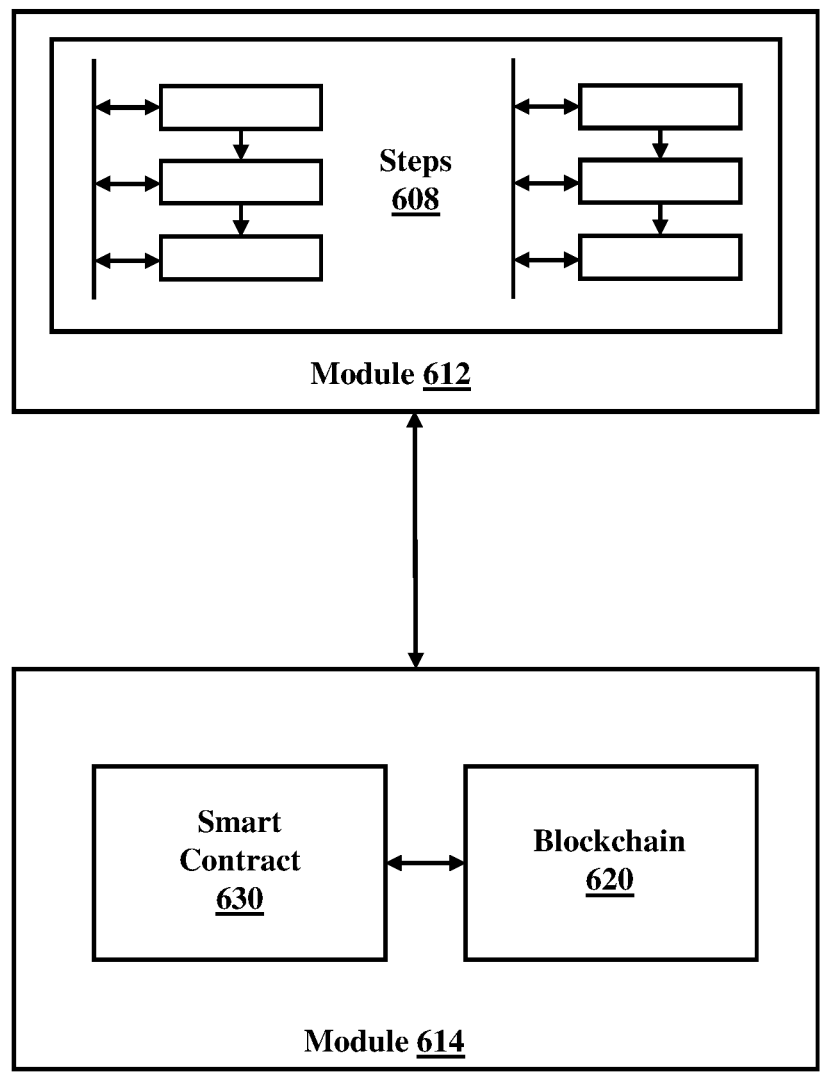
FIG. 6D illustrates another example system configured to perform one or more operations described herein, consistent with some embodiments.

FIG. 6D illustrates another example system configured to perform various operations, consistent with some embodiments. Referring to FIG. 6D, the system includes a module 612 and a module 614. The module 614 includes a blockchain 620 and a smart contract 630 (which may reside on the blockchain 620), that may execute any of the operational steps 678 (in module 612) included in any of the example embodiments. The steps/operations 678 may include one or more of the embodiments described or depicted and may represent output or written information that is written or read from one or more smart contracts 630 and/or blockchains 620. The physical module 612 and the module 614 may include one or more computers, servers, processors, memories, and/or wireless communication devices. Further, the module 612 and the module 614 may be a same module.

Figure 6E:
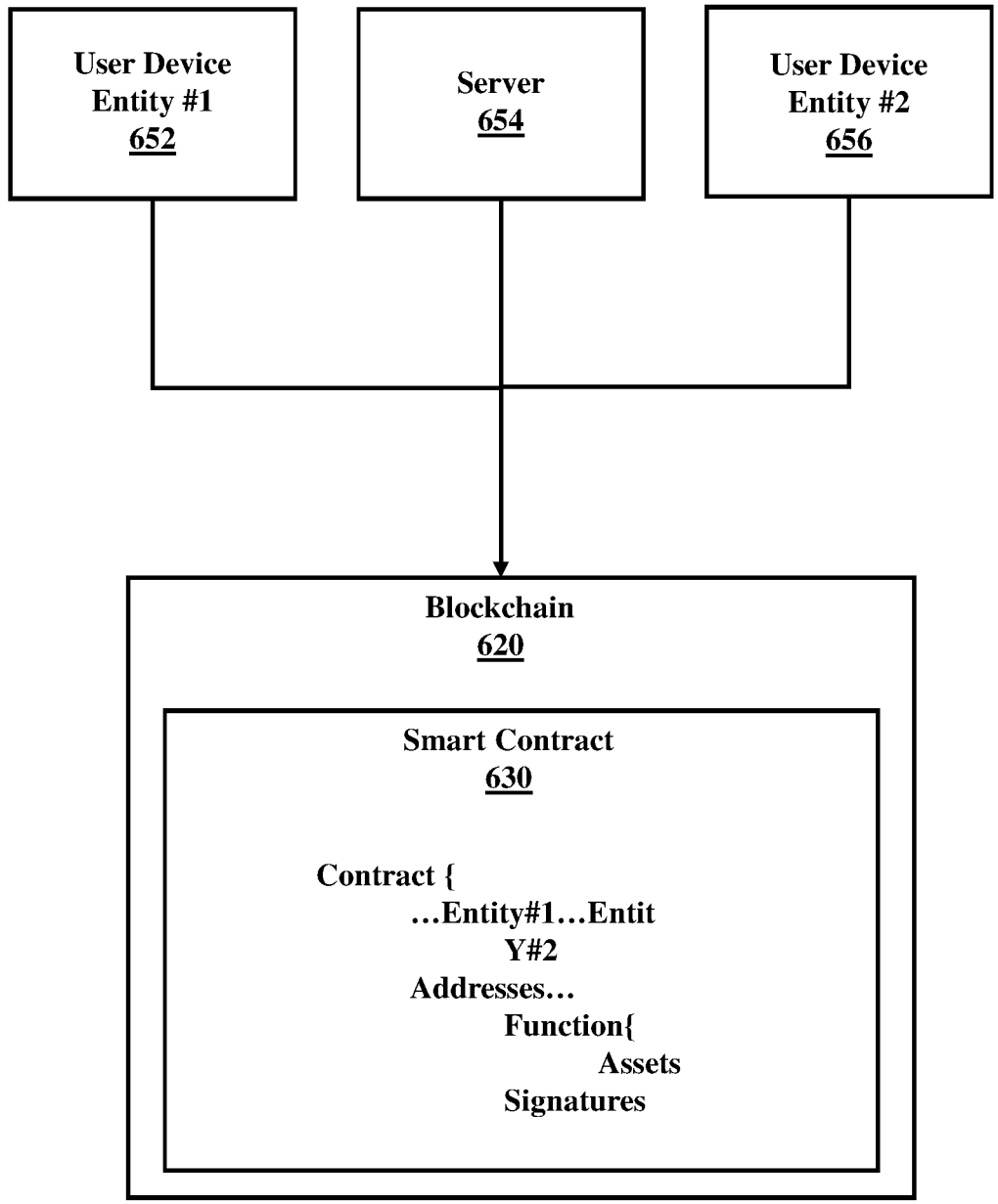
FIG. 6E illustrates a further example system configured to utilize a smart contract, consistent with some embodiments.

FIG. 6E illustrates an example system configured to utilize a smart contract configuration among contracting parties and a mediating server configured to enforce the smart contract terms on the blockchain 620, consistent with some embodiments. Referring to FIG. 6E, the configuration may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6F:
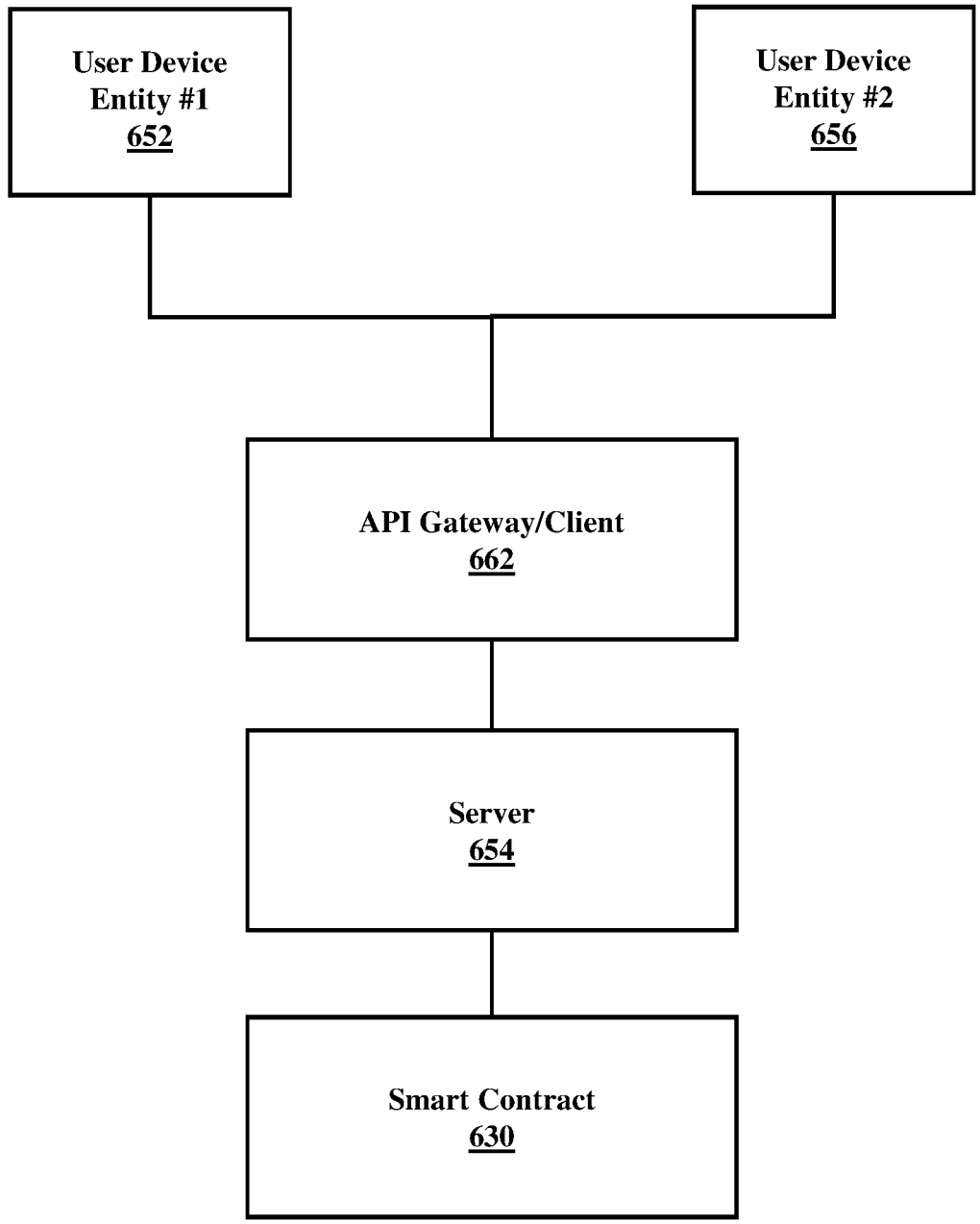
FIG. 6F illustrates a system including a blockchain, consistent with some embodiments.

FIG. 6F illustrates a system 660 including a blockchain, consistent with some embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

Block Processing

Figure 7A:
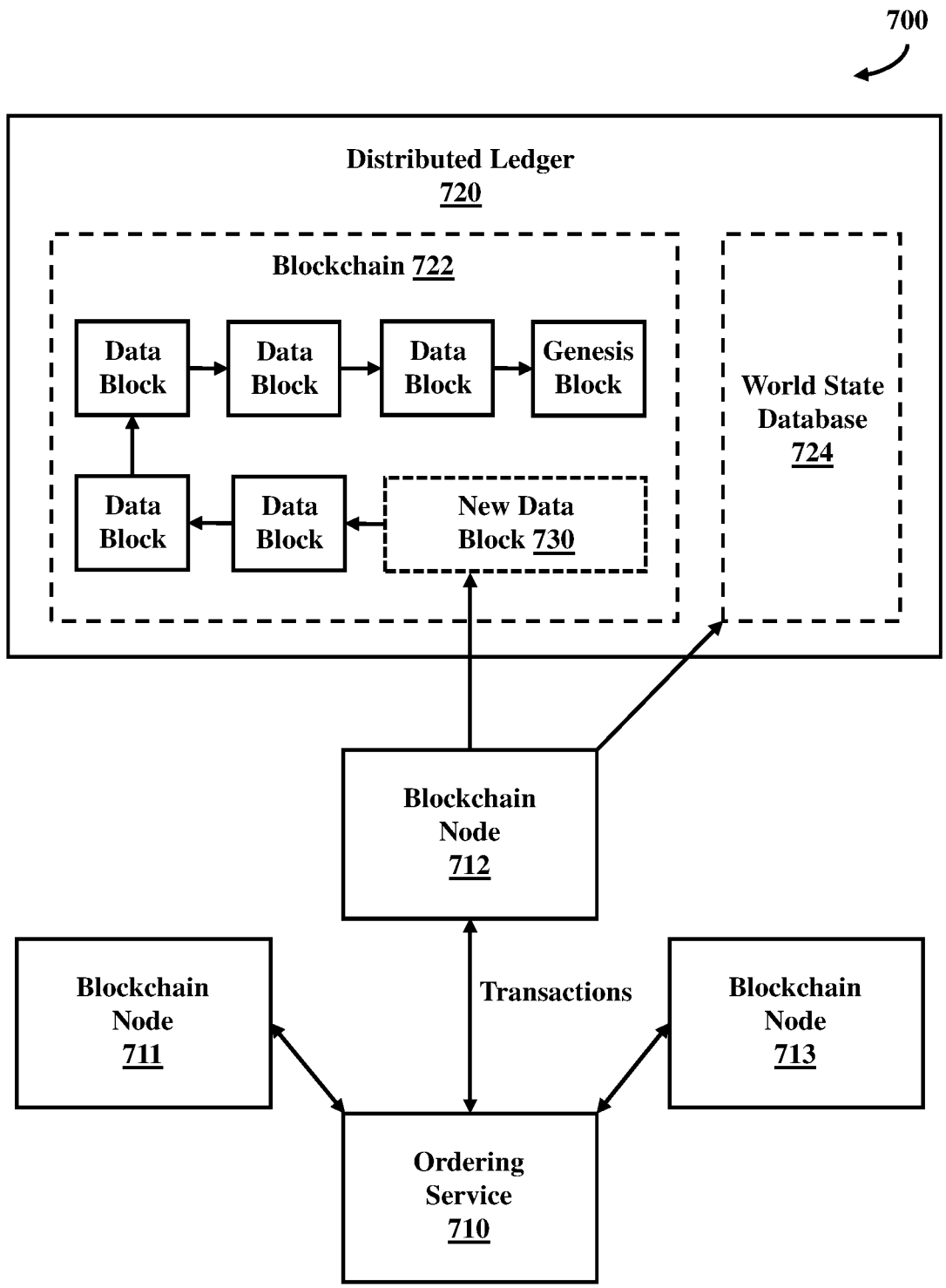
FIG. 7A illustrates a process for a new block being added to a distributed ledger, according to example embodiments.
Figure 7B:
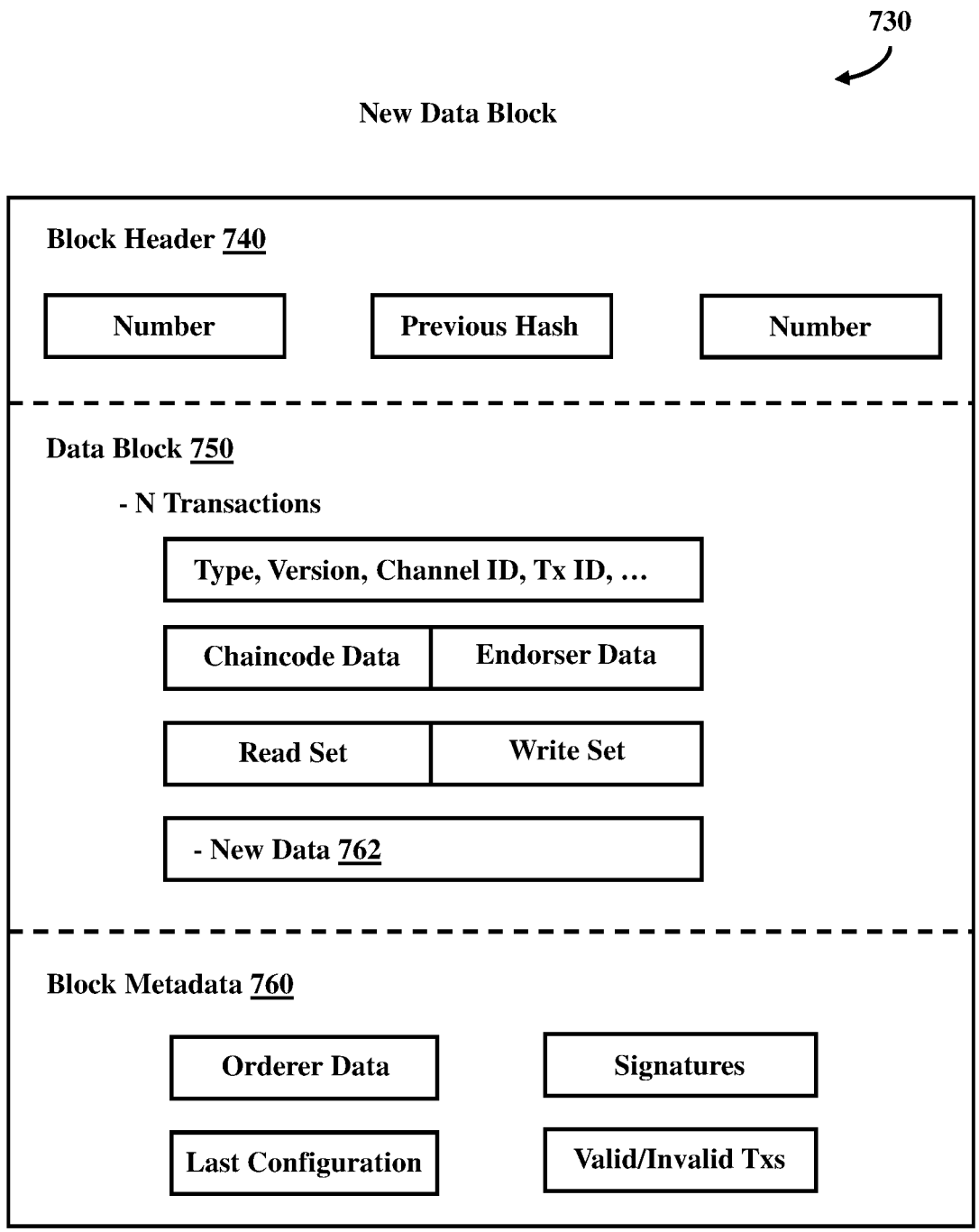
FIG. 7B illustrates contents of a new data block, according to example embodiments.

FIG. 7A illustrates a process 700 of a new block being added to a distributed ledger 720, consistent with some embodiments, and FIG. 7B illustrates contents of a new data block structure 730 for blockchain, consistent with some embodiments. The new data block 730 may contain document linking data.

Referring to FIG. 7A, clients (not shown) may submit transactions to blockchain nodes 711, 712, and/or 713. Clients may be instructions received from any source to enact activity on the blockchain 722. As an example, clients may be applications that act on behalf of a requester, such as a device, person, or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In some embodiments, the blockchain nodes 711, 712, and 713 may perform the role of endorser node, committer node, or both.

The distributed ledger 720 may include a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 may be a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 may be sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions more efficient, the latest values of all keys may be stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 722. The first block in the blockchain may be referred to as a genesis block, which includes information about the blockchain, its members, the data stored therein, etc.

The ordering service 710 may be made up of a cluster of orderers. The ordering service 710 in some embodiments may not process transactions, smart contracts, or maintain the shared ledger. Rather, the ordering service 710 in these embodiments may accept the endorsed transactions and specify the order in which those transactions are committed to the distributed ledger 720. The architecture of the blockchain network may be designed such that the specific implementation of "ordering" (e.g., Solo, Kafka, BFT, etc.) becomes a pluggable component.

Transactions in some embodiments may be written to the distributed ledger 720 in a consistent order. The order of transactions in these embodiments may be established to ensure that the updates to the state database 724 are valid when they are committed to the network. Unlike a cryptocurrency blockchain system (e.g., Bitcoin, etc.), where ordering occurs through the solving of a cryptographic puzzle, or mining, in this example the parties of the distributed ledger 720 may choose the ordering mechanism that best suits that network.

In some embodiments, when the ordering service 710 initializes a new data block 730, the new data block 730 may be broadcast to committing peers (e.g., blockchain nodes 711, 712, and 713). In response, each committing peer may validate the transaction within the new data block 730 by checking to make sure that the read set and the write set still match the current world state in the state database 724. Specifically, the committing peer may determine whether the read data that existed when the endorsers simulated the transaction is identical to the current world state in the state database 724. When the committing peer validates the transaction, the transaction may be written to the blockchain 722 on the distributed ledger 720, and the state database 724 may be updated with the write data from the read-write set. In some embodiments, if a transaction fails (e.g., if the committing peer finds that the read-write set does not match the current world state in the state database 724), the transaction ordered into a block may still be included in that block, but marked as invalid, and the state database 724 not updated.

Referring to FIG. 7B, a new data block 730 (also referred to as a data block) that is stored on the blockchain 722 of the distributed ledger 720 may include multiple data segments in some embodiments, such as a block header 740, block data 750, and block metadata 760. It should be appreciated that the various depicted blocks and their contents, such as new data block 730 and its contents, shown in FIG. 7B are merely examples and are not meant to limit the scope of the example embodiments. The new data block 730 may store transactional information of N transaction(s) (e.g., 1, 10, 100, 200, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of: a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762, which adds additional information to the hash-linked chain of blocks in the blockchain 722. The additional information may include one or more of the steps, features, processes and/or actions described or depicted herein. Accordingly, the new data 762 may be stored in an immutable log of blocks on the distributed ledger 720. Some of the benefits of storing such new data 762 are reflected in the various embodiments disclosed and depicted herein. Although in FIG. 7B the new data 762 is depicted in the block data 750, it could also be located in the block header 740 or the block metadata 760 in some embodiments. The new data 762 may also include a document composite key that is used for linking the documents within an organization.

The block metadata 760 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
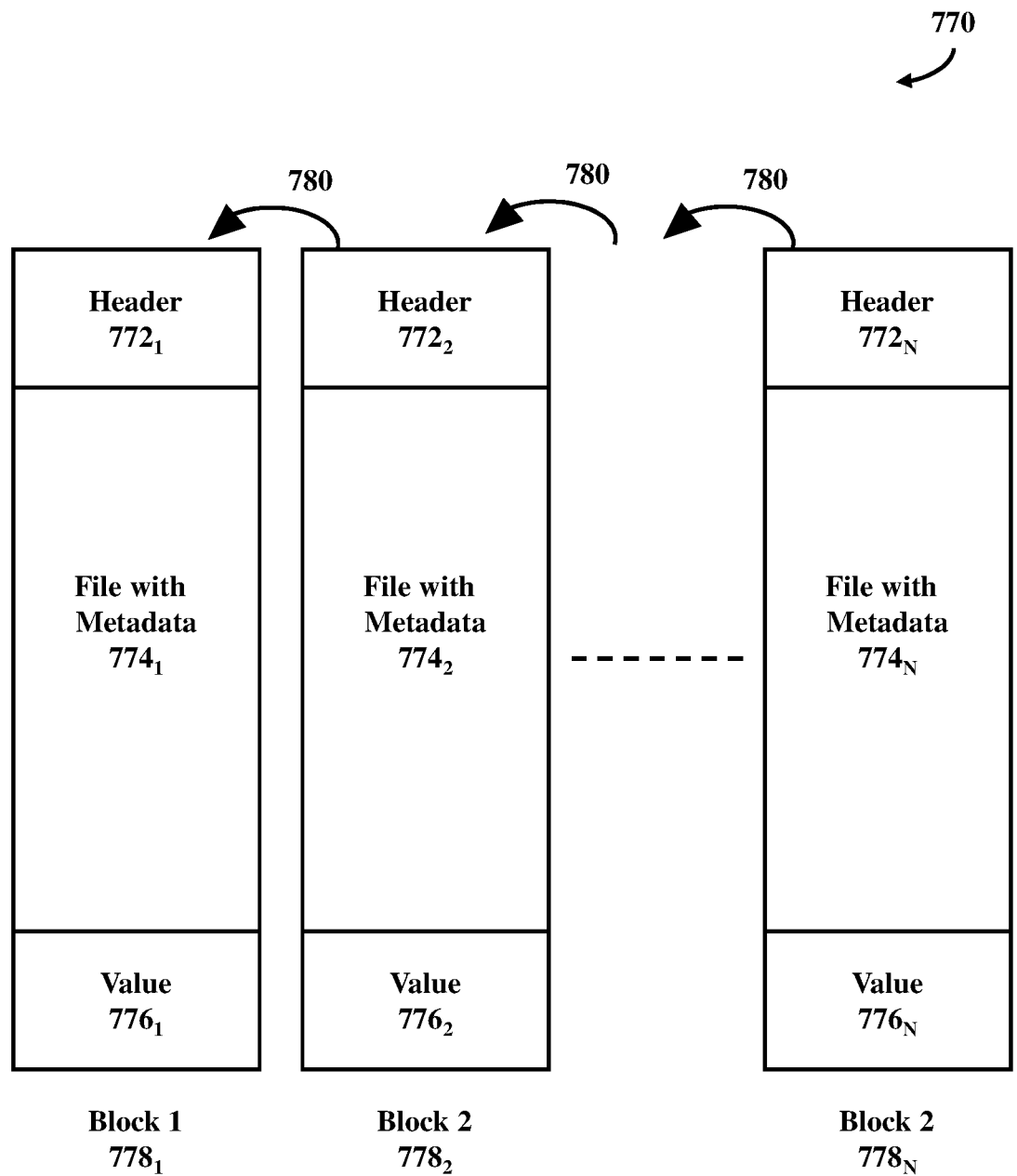
FIG. 7C illustrates a blockchain for digital content, according to example embodiments.

FIG. 7C illustrates an embodiment of a blockchain 770 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---------|---------|-----|---------|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that value in the storage area, which is stored in correspondence with the actual digital content. This operation may be performed, for example, a database gatekeeper. This may be illustrated as follows:

| Blockchain | Storage Area |
|------------|--------------|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to: a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $778_1$ in the blockchain is referred to as the genesis block and may include the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block may not reference a previous block, simply because there is no previous block.

The original file $774_1$ in the genesis block may be, for example, data as captured by a device with or without processing prior to its inclusion in the blockchain. The original file $774_1$ may be received through the interface of the system from the device, media source, or node. The original file $774_1$ may be associated with metadata, which, for example, may be generated by a user, the device, and/or the system processor, either manually or automatically. The metadata may be included in the first block $778_1$ in association with the original file $774_1$.

The value $776_1$ in the genesis block may be an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the header $772_1$ of the first block, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.
  a) new SHA-2 computed hash value if the file has been processed in any way (e.g., if the file was redacted, copied, altered, accessed, or some other action was taken)
  b) new storage location for the file
  c) new metadata identified associated with the file
  d) transfer of access or control of the file from one blockchain participant to another blockchain participant FIG. 7D illustrates an embodiment of a block, which may represent the structure of the blocks in the blockchain 790, consistent with some embodiments. The block, $Block_i$, may include a header $772_i$, a file $774_i$, and a value $776_i$.

The header $772_i$ may include a hash value of a previous block $Block_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $774_i$ may include a plurality of data, such as Data 1, Data 2, . . . , Data N in sequence. The data are tagged with Metadata 1, Metadata 2, . . . , Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $776_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. An access management process orchestration method, comprising:
   receiving, by an access management governance orchestrator blockchain network, a request for accessing a first managed resource of a first information system, wherein the first managed resource is one of a plurality of managed resources locally managed by one of a plurality of information systems and wherein each of the plurality of information systems includes a local access control system that manages a local authorization policy for a respective plurality of local resources, wherein the local access control system is not part of the blockchain network;
   querying, by the access management governance orchestrator blockchain network, an authorization for accessing the first managed resource from an access manager;
   in response to the querying of the authorization, requesting, by the access management governance orchestrator blockchain network, an access control policy update to grant access to the first managed resource from an owner of the first information system;
   receiving an approval of the request for the access control policy update from the owner of the first information system; and
   in response to the approval of the request for the access control policy update, calling, by the access management governance orchestrator blockchain network, a respective one of the local access control systems to request a change to its respective local authorization policy with respect to the first managed resource;
   wherein receiving the request for accessing the first managed resource, querying the authorization, receiving the approval, and requesting the access control policy update each comprises:
   generating a transaction record; and
   adding the transaction record to a distributed ledger, wherein the distributed ledger simultaneously maintains the transaction record at multiple nodes throughout the blockchain network, wherein requesting the access control policy update comprises executing a smart contract that processes transactions in the distributed ledger.

2. The method of claim 1, wherein the method further comprises exchanging the transaction record between the multiple nodes of the distributed ledger.

3. The method of claim 2, wherein the multiple nodes are interconnected via cryptographically secured channels.

4. The method of claim 1, wherein the transaction record comprises at least one administrative action selected from the group consisting of a request access action, an access approved action, an access denied action, an access granted action, a revoke access action, and an access revoked action.

5. The method of claim 4, wherein the administrative action associated with the access granted action changes an authorization policy to allow access of a user to the first information system.

6. The method of claim 4, wherein the administrative action associated with the revoke access action changes an authorization policy to deny access of a user to the first information system.

7. The method of claim 4, further comprising:
   transmitting the transaction record to the first information system; and
   automatically executing the administrative action on the first information system.

8. An access management governance orchestrator, comprising:
   a peer node associated with a blockchain network, the blockchain network comprising a plurality of nodes associated with at least one of an asset owner function, an administrator function, and an auditor function, the peer node adapted to:
   receive a request for accessing to a first managed resource of a first information system, wherein the first managed resource of the first information system is one of a plurality of managed resources locally managed by one of a plurality of information systems and wherein each of the plurality of information systems includes a local access control system that manages a local authorization policy for a respective plurality of local resources, wherein the local access control system is not part of the blockchain network;
   record a request access record in a distributed ledger;
   record an owner approval record from the asset owner function in the distributed ledger, the owner approval record responsive to the request access record;
   execute a smart contract responsive to the request access record and the owner approval record granting access on the first information system, wherein the smart contract requests a change in the local authorization policy of the first information system to allow access of a user to the first information system outside of the blockchain network, wherein changing the authorization policy comprises calling the local access control system associated with the first information system to request the change to the local authorization policy; and record an execution record of the smart contract in the distributed ledger.

9. The access management governance orchestrator of claim 8, wherein the peer node is further adapted to:

storing one or more of the request access record, the owner approval record, and the execution record in a transaction block;

selecting one of the plurality nodes as a signature node to sign the transaction block according to a consensus protocol; and signing, by the selected signature node, the transaction block.

10. The access management governance orchestrator of claim 8, wherein the peer node is further adapted to:

receive a new peer request to add a new node to the blockchain network; and transmitting the new peer request to the plurality of nodes in the blockchain network for approval according to a consensus protocol.

11. The access management governance orchestrator of claim 8, wherein the peer node is further adapted to review the distributed ledger for execution records that are not associated with owner approval records.

12. A computer program product comprising a non-transitory computer readable storage medium having a plurality of instructions stored thereon, which, when executed by a processor, cause the processor to:

receive, by an access management governance orchestrator blockchain network, a request for accessing a first managed resource of a first information system, wherein the first managed resource of the information system is one of a plurality of managed re-sources of a plurality of information systems and wherein each of the plurality of information systems includes a local access control system that manages a local authorization policy for a respective plurality of local resources, wherein the local access control system is not part of the blockchain network;

query, by the access management governance orchestrator blockchain network, an authorization for accessing the first managed resource from an access manager;

in response to the querying the authorization, request, by the access management governance orchestrator blockchain network, a change to the local access control policy of a respective one of the plurality of information systems to grant access to the first managed resource from an owner of the first information system;

receiving an approval of the request for the access control policy update from the owner of the information system; and in response to the approval of the request for the access control policy update, calling, by the access management governance orchestrator blockchain network, a respective one of the local access control systems to request a change to its respective local authorization policy with respect to the first managed resource;

wherein receiving the request for accessing the first managed resource, querying the authorization, receiving the approval, and requesting the access control policy update each comprises:

generating a transaction record; and adding the transaction record to a distributed ledger, wherein the distributed ledger simultaneously maintains the transaction record at multiple nodes throughout the blockchain network, wherein requesting the access control policy update comprises executing a smart contract that processes transactions in the distributed ledger.

13. The computer program product of claim 12, wherein the transaction record includes at least one administrative action chosen from the group consisting of a request access record, an access approved record, an access denied record, an access granted record, a revoke access record, and an access revoked record.

* * * * *